US010330924B2

(12) United States Patent
Egloff et al.

(10) Patent No.: US 10,330,924 B2
(45) Date of Patent: Jun. 25, 2019

(54) METHOD FOR GENERATING A CONTROL FUNCTION AND METHOD FOR OPERATING A SCANNING UNIT

(71) Applicant: Carl Zeiss Microscopy GmbH, Jena (DE)

(72) Inventors: Thomas Egloff, Schwarza (DE); Volodymyr Kudryavtsev, Jena (DE); Frank Klemm, Jena (DE); Joerg Engel, Weida (DE)

(73) Assignee: Carl Zeiss Microscopy GmbH, Jena (DE)

( * ) Notice: Subject to any disclaimer, the term of this patent is extended or adjusted under 35 U.S.C. 154(b) by 19 days.

(21) Appl. No.: 15/594,316

(22) Filed: May 12, 2017

(65) Prior Publication Data

US 2017/0329129 A1 Nov. 16, 2017

(30) Foreign Application Priority Data

May 13, 2016 (DE) .................. 10 2016 005 979
Jun. 24, 2016 (DE) .................. 10 2016 211 373

(51) Int. Cl.
*G02B 26/08* (2006.01)
*G02B 26/10* (2006.01)
(Continued)

(52) U.S. Cl.
CPC ......... *G02B 26/101* (2013.01); *G02B 21/002* (2013.01); *G02B 21/365* (2013.01); *G02B 26/10* (2013.01); *G05B 15/02* (2013.01)

(58) Field of Classification Search
CPC .. G02B 26/101; G02B 21/002; G02B 21/365; G02B 26/10; G02B 15/02; G02B 27/0031; H03B 1/04
(Continued)

(56) References Cited

U.S. PATENT DOCUMENTS

| 6,037,583 A | 3/2000 | Moehler et al. |
| 6,188,880 B1 * | 2/2001 | Sanielevici ............. H03D 1/04 375/346 |
| 7,679,045 B2 * | 3/2010 | Steinert ............. G02B 27/0031 250/234 |

FOREIGN PATENT DOCUMENTS

| DE | 19702752 A1 | 7/1998 |
| DE | 102004034978 A1 | 2/2006 |

(Continued)

OTHER PUBLICATIONS

York et al.: Driving mems mirrors far beyond their specifications for fast, precise, synchronized laser scanning. In: P 2251b/2.14 Focus on Microscopy, FOM 2015, Mar. 29-Apr. 1, 2015, Lokhalle, Gottingen, Germany. 2015, p. 486.

*Primary Examiner* — Euncha P Cherry
(74) *Attorney, Agent, or Firm* — Ewers & Hasselmann PLLC

(57) ABSTRACT

A method for generating a control signal is provided. The method includes the steps of decomposing a desired movement into two partial movements which are separately equalized, and the desired control signal is obtained by summing up the corrected components. The first movement is a slowly (mostly linear) changing long-period (period T1) movement, and the second movement is a short-period (period T2) movement, wherein the period T1 is substantially longer than the period T2. The movements have to a large extent opposing temporal derivations which are nevertheless equal in magnitude so that their sum has a time derivative that is zero. In addition, a method is provided for operating a scanning unit periodically displaceable in an infeed direction by an infeed distance.

14 Claims, 10 Drawing Sheets

(51) Int. Cl.
*G05B 15/02* (2006.01)
*G02B 21/00* (2006.01)
*G02B 21/36* (2006.01)

(58) Field of Classification Search
USPC ...................................................... 359/202.1
See application file for complete search history.

(56) References Cited

FOREIGN PATENT DOCUMENTS

DE     102005047200 A1    4/2007
DE     102007008009 B3    8/2008

\* cited by examiner

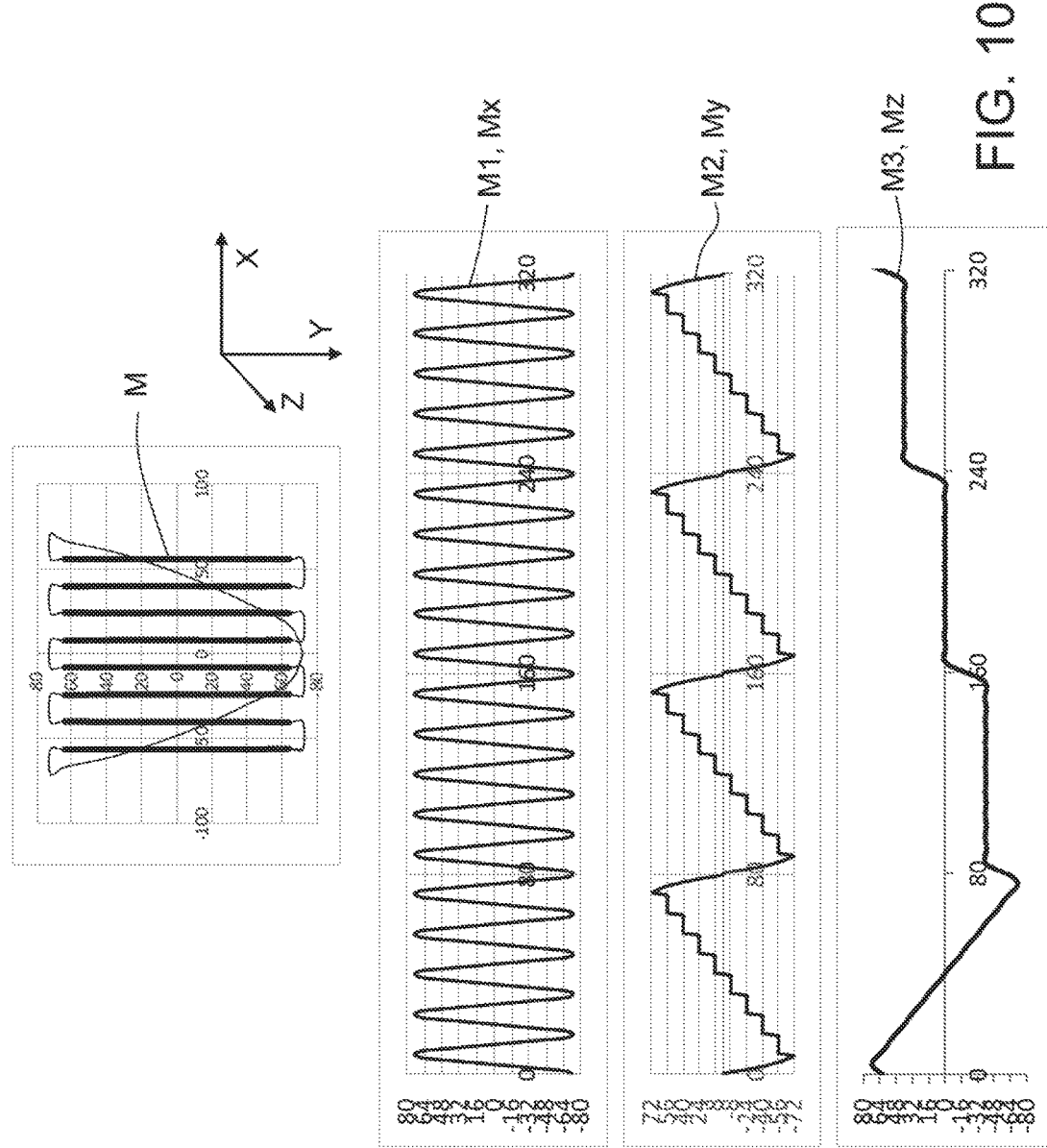

METHOD FOR GENERATING A CONTROL FUNCTION AND METHOD FOR OPERATING A SCANNING UNIT

CROSS REFERENCE TO RELATED APPLICATIONS

This application is claiming priority to German Application Nos. 10 2016 005 979.6, filed May 13, 2016, and 10 2016 211 373.9, filed Jun. 24, 2016, and the entire content of both applications is incorporated herein by reference.

TECHNICAL FIELD

The present invention relates to a method for generating a control function and to a method for operating a scanning unit.

BACKGROUND

In a scanning image capture, e.g. in laser scanning microscopes (LSMs), conventionally two 1D scanners or one 2D scanner are used. In this case, an object of which an image is to be created is scanned point by point and line by line (scanning).

In the process, a scanning unit, for example a scanner, is placed at one end of a line to be scanned. The relevant line is scanned once or several times, and the scanning unit is placed at one end of another line to be scanned (line feed).

For the line feed, the scanning unit is moved so that during a turnaround phase of the scanning movement (subsequently also referred to as turnaround area) the scanning unit is moved perpendicularly to the direction of the rapid scanning in the direction of the line (line scan), for example one line down. Afterwards, the scanning unit remains in this direction (infeed direction) at a constant position until the line scan is completed.

Due to the limited reaction speed of a controlled scanning unit, at a higher scanning speed, the controlled scanning unit can no longer follow an intended nominal movement, which results in a position error for the line feed LF. The position error depends on the position in the rapid scanning direction and on the current direction of the line scan, e.g. forward scan or backward scan. The scanned image values result in a distorted image with additional image defects since image scanning and image representation do not match.

Such distortions and image defects are particularly problematic in bidirectional scanning given that the image errors of even-numbered and odd-numbered lines differ and lines are no longer parallel to one another. In multi-spot scans in the line direction, the line interlaces are greater, are additionally emphasized by offsetting, and are significantly more visible to the human eye due to their structure. Problematic are also strong undersampling, scanning of every x-th line and offsetting (e.g. interpolation) of the pixels between them (line-step mode) as well as resonant scans with high speed in the line direction.

One known solution for the problem is to reduce the useful area UA (FIG. 1) of each scan curve SC in order to increase the turnaround area TA given that the sum of the useful area UA and turnaround area TA is always 100%. This leaves more time to move in the direction LD of the line feed LF. By enlarging the turnaround area TA from 16% (useful area UA 84%) to 48% (useful area UA 52%), the scan can be performed three times faster; by enlarging the turnaround area TA from 16% (useful area UA 84%) to 96% (useful area UA 4%), the scan can be performed six times faster, with the same position error in the feed direction, and thus already shows the limit of the method. The useful area UA becomes increasingly smaller and converges towards zero.

In the scanning image capture, the scan is performed in the direction of the rapid scanning (line scan) with a temporally triangular scan trajectory in order to achieve a constant scanning speed over a useful area UA of a scan curve SC (FIG. 1).

In order to also compensate for remaining residual errors, a control function that is utilized for controlling the scanning unit must be pre-distorted for a scan at a constant scanning speed, as is known, for example, from U.S. Pat. No. 6,037,583.

U.S. Pat. No. 6,037,583 describes a control system for a scanner drive, in particular for a laser scanning microscope. The scanner drive includes an oscillating motor for driving an oscillating mirror used for a linearly oscillating deflection of a beam. Furthermore, a control unit for supplying the oscillating motor with an exciting current is provided, which is variable with regard to the control frequency, the frequency curve and the amplitude. A function generator is provided, which is connected to the control unit. A measuring sensor serves to obtain a sequence of information about the deflection positions of the oscillating mirror. An arithmetic unit is configured for determining correction values for the exciting current from a comparison of actual and nominal values of the deflection position. In the arithmetic unit, arithmetic circuits are provided, which are configured for converting the information about the deflection positions of the oscillation mirror according to the amplitude and phase of the scanner based on a plurality of control frequencies.

From the publication by John Giannini et al., "Driving MEMS mirrors for beyond their specification for fast, precise, synchronized laser scanning", Focus on Microscopy 2015, a method is known, by which a pre-distorted control function for the line scan of MEMS devices is generated close to or above their resonance frequencies. To this end, a nominal function corrects and pre-distorts a control function with the deviations caused by the transmission function of the actual control function.

SUMMARY

It is an object of the invention to provide methods for generating a control function and for operating a scanning unit that are improved in comparison with the related art.

The method for generating the control function includes the following steps, wherein additional method steps can be performed.

To generate the control function by a computer, a first function and a second function are derived, and the two functions are summed up to obtain a resulting control function.

According to an aspect of the invention, the first function is, at least in sections, a linear function with a first frequency (and a first period), and the second function is a periodic function with a second frequency (and a second period).

The first frequency is lower than the second frequency, the first function and the second function increase in directions opposite to each other over sections of their temporal progression, and the increases are of the same magnitude.

A continuously linear function is considered as a function with a very low frequency.

The counter-direction and the equality in magnitude is particularly important over sections in which at least one coordinate is to be kept constant by the control function. For example, the first function and the second function increase in directions opposite to each other over a useful area intended for acquiring image data, and the increases are equal in magnitude.

The technical effect of the increases, which are in opposite or counter-directions in relation to each other, and which are equal in magnitude, is a mutual compensation which keeps at least one coordinate constant for the duration of the temporal section or the temporal sections, respectively. In a diagram in which the first and second functions are plotted over time, as a consequence of said compensation, the resulting function is parallel to the time axis.

According to an aspect of the invention, a control function is provided, in particular in the form of a so-called step function, which is the sum of linear function(s), or functions that are linear at least in some sections, respectively, and of at least one periodic function, such as a sawtooth function, which together have an increase of zero in the useful area. These two portions of the resulting control function are separately equalized. Using the control function, control signals are generated, the execution of which generates the desired movement.

It is an advantage that the first function has a comparatively low frequency and can be easily equalized.

The second function is periodic and can be efficiently calculated by a suitable Fourier synthesis.

The desired movement in the direction of the line scanning (pixel feed) can be continued to be achieved by harmonic synthesis as described in U.S. Pat. No. 6,037,583. The harmonic components are suitably to be chosen so that the desired movement (triangular movement or sawtooth movement) is performed. To this end, the harmonic components, for example, can be equalized in accordance with the transmission behavior of the scanners.

The desired movement of the scanner in the direction of the image scanning (line feed) is decomposed into at least two movement components, one of which changes only slowly, usually linearly over time, and the other component(s) are temporally periodic movements.

In the following, the terms movement components, component and components of the movement are used interchangeably.

Both or more components of the movement are then equalized separately from one another by appropriate methods in each case and result in the respective components of the control signal. The sum of all components of the control signal constitutes the actual resulting control signal.

According to an aspect of the invention, the first movement component is a long-period function usually changing slowly which can also contain short sections of rapid changes. These slowly changing areas are usually linear.

The second and additional components, on the other hand, are short-period components and usually have a lower amplitude. They are determined by a harmonic approximation which minimizes the deviation of the component in the time domain during the image capture. The deviation is the difference between the actually desired nominal movement and the harmonic approximation.

For the main application of the method described above, the temporal change in both movements (movement components) in some sections is equal in magnitude but opposite in sign so that the sum is constant in some sections. To achieve this property, the amplitude of the second component is proportional to the rate of change (including sign) of the first component. In principle, however, the method is suitable for any movements which do not possess this particular property.

Equalization of the movement is understood to be the calculation of a control signal which leads to the desired movement. In this process, a transmission behavior of a device to be controlled, for example described by a transmission function, is advantageously taken into account.

This can be achieved for the two components of the movement in the following ways:

The first movement component is a low-frequency component and comparatively static in the areas(s) critical for the image capture. It either does not need to be equalized at all, or simple locally effective methods (e.g. lower-order location filters) are sufficient. This is numerically simple to carry out or avoids propagating errors from areas uncritical for the image capture.

The second component is a short-period component, which contains only a few and only higher-frequency spectral components, and except for their amplitude, these spectral components are not dependent on the low-frequency movement component. These spectral components are equalized with the inverse transmission function in the frequency space.

The control signal generated according to an aspect of the invention is advantageously usable in a method for operating a scanning unit that is periodically displaceable in an infeed direction by an infeed distance, for example as an element of an image capture unit. To this end, the control signal is determined, control signals are generated depending on the desired movement, and the control signals are utilized to control the scanning unit.

According to an aspect of the method, the first movement (e.g. first movement component) is a sawtooth or triangular movement each having a linear slope time corresponding to the capture time of an image. Times for returning back to the beginning of the image or reversing the movement direction may be added.

The second movement (e.g. second movement component) is, for example, a sawtooth function with a period corresponding to the gross capture time of an image line. The sawtooth function has a constant increase in the area of the net capture time of an image line. The amplitude is proportional to the respective increase in the first movement.

To generalize, it can be said that the first movement (representable by the first function, wherein a function is a mathematical calculation rule, for example of the general form f(x)) and the second movement (representable by the second function) can be pre-distorted independently of each other by a transmission function of the scanning unit.

The scanning unit is controlled with the generated control function. A feed undesirably occurring in infeed direction by the first component is compensated for by the second component.

According to an aspect of the invention, the control function is used for controlling the line feed of a scanning unit configured as a scanner.

If more than two dimensions are scanned, the method can also be used for this purpose. Movements other than rapid line scanning are produced by slow, piecewise linear movements an average speed of which is equal to the speed at which the dimension is scanned. Undesired movement during the scanning of low dimensions is compensated for by the method, already known from 2D scanning, by adding harmonic functions compensating for the slow constant movement during the actual image scanning of low dimensions and thereby performing the actual position change between the image scanning.

This can, for example, be performed for a Z scanner which requires a comparatively small amount of time to step (to be adjusted) between the planes, and thus steps without usual waiting periods between the planes.

This is necessary, in particular, for bi-directional Z scans, since the image planes for the two scanning directions (e.g. down and up) otherwise have an opposing oblique position.

The method is to be performed in an equivalent manner for higher dimensions.

If the image capture is performed with a turned scanning field in regard to the scanning directions of the scanner, the individual dimensions are no longer served by separate scanners. Instead, the dimensions are scanned proportionately by multiple scanners. Feed and line scans are decomposed proportionally according to the scanning direction of the scanner. The previously described method for the pre-distortion for the components of the line movement and the feed in the different dimensions is performed in accordance with the earlier described methods. The transmission behavior of the corresponding scanner can be used for the pre-distortion. The pre-distorted components are summed separately for each scanner, and the scanner is thereby controlled.

The method can also be used for multiple scanning of a line which is applied both in the multiple scanning of a line for the purpose of averaging and for the purpose of scanning a line with varying illumination. The sawtooth component is calculated here for a frequency which is lower by the factor of the multiple scanning. The harmonic approximation is different in this case due to other scanning ranges.

According to a further aspect of the invention, the pre-distortion can also be performed, instead of a control or a pre-distortion, respectively, of a scanning unit, for example of a controlled scanner, at the input of the nominal position of the controller, at another location of the controller as an actuating signal or completely uncontrolled. In this case, the frequency response of the scanner relative to the signal is simply to be used at this location.

BRIEF DESCRIPTION OF THE DRAWINGS

The invention will now be described with reference to the drawings wherein:

FIG. 10 illustrates schematically the complete movement of the scanners for a 3D scan aligned with the scanner axes, with the XY view of the movement (top), the X component (top center), the Y component (bottom center) and the Z component of movement (bottom), in which a complete slice (time 0-80) is used for the method of the Z scanner at the first Z position (Z position 40).

DESCRIPTION OF EXEMPLARY EMBODIMENTS

Figure 1:
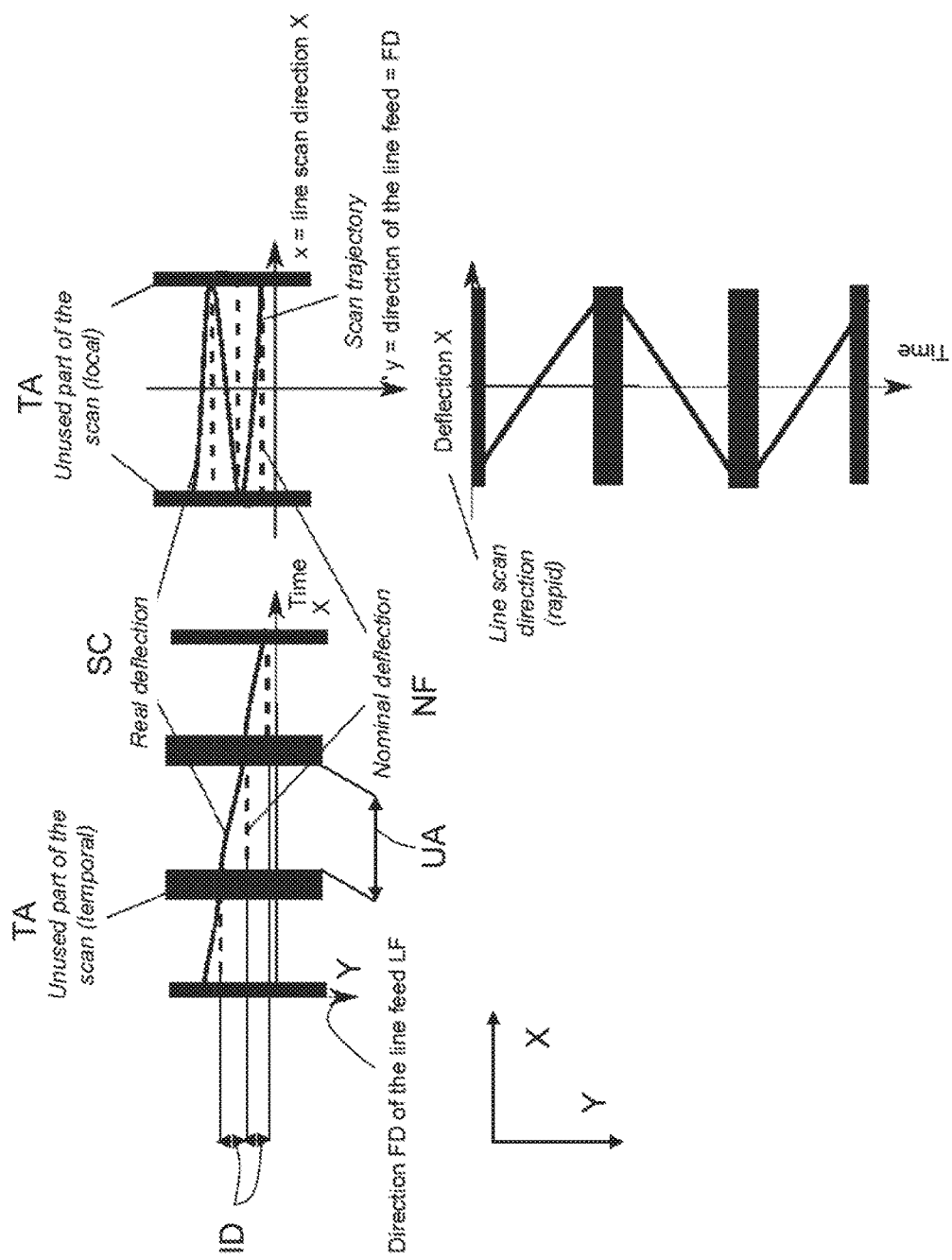
FIG. 1 shows a schematic overview of possible deviations of actual scan curves from nominal functions.

FIG. 1 shows possible deviations of actual scan curves SC from the nominal functions NF. The actually realized scan curves SC are shown as solid lines, and the nominal functions NF are shown as dashed lines. A line feed LF occurs in an infeed direction FD which coincides with the direction of a Y-axis Y of a two-dimensional XY coordinate system. The realized infeed distance ID for each performed line feed LF is constant.

At the beginning and at the end of each line scan, a directional change of a scanning unit (not shown) performing a line scan in the rapid scanning direction (here, e.g., X) occurs in a turnaround area TA. Between the turnaround areas TA, the scanning unit passes through a useful area UA over whose duration over time image values can be acquired. Taking into account, for example, current values of the orientation of the scanner and/or using measurements, location data can be assigned to each image value so that location-resolved image values are obtained.

As can be seen in FIG. 1, large deviations occur between the scan curves SC and the nominal movement functions NF, which to a large extent can be attributed to the line feed LF being offset in time with respect to the line scan to which it occurs in a lagging manner. As a result, a zigzag-shaped scan occurs in the XY plane (real deflection).

Figure 2:
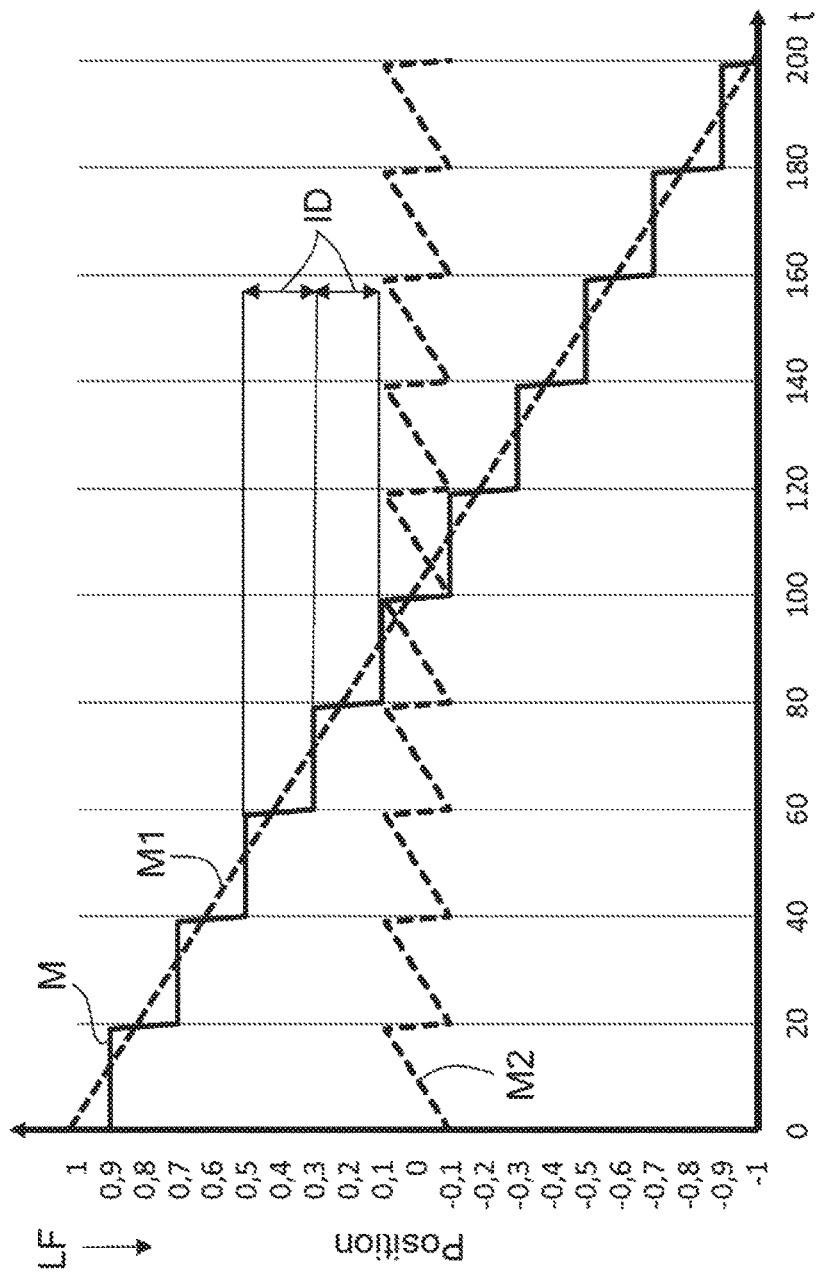
FIG. 2 illustrates schematically a first exemplary embodiment of a method for decomposition of the components of the line feed for a section of a 2D scan.

In a first exemplary embodiment of the invention (FIG. 2), a first movement component M1 is determined (e.g. identified) in the form of a line and a second movement component M2 in the form of a sawtooth function. The increases in the two components M1, M2 are opposite to each other over sections of their time profile and are equal in magnitude so that no movement M occurs in the direction of the image feed. FIG. 2 shows the movement in the image-feed direction (e.g. Y, see for example FIG. 1). The scanning field is scanned from −1 to +1 in this direction.

Figure 3:
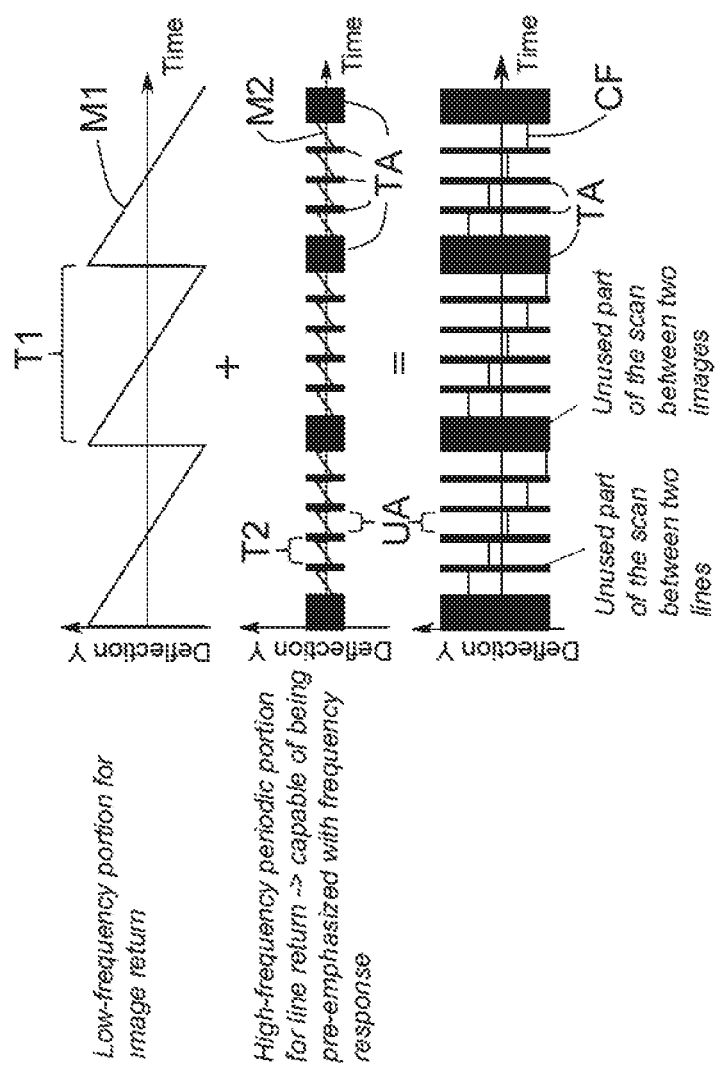
FIG. 3 illustrates schematically a second exemplary embodiment of the method with useful areas and turnaround areas for a time-recurrent 2D scan.

The principle discussed in FIG. 2 is also applied in the second exemplary embodiment of the method according to the invention shown in FIG. 3. Here, the first movement component M1 is a linear sawtooth function in some sections with a negative increase and a first period T1. The second movement component M2 is a sawtooth function having the second period T2 with T1>T2.

In FIG. 3, the useful areas UA and the turnaround areas TA are plotted, the latter shown as black bars. The turnaround areas TA represented by wide bars represent turnaround areas during which an image return occurs. The control function CF is shown schematically and depicted in the useful areas UA.

The desired infeed or feed movement, for example of the scanning unit, from one scanned line to the next line to be scanned, is decomposed into two components, the slow component M1 with the first period T1 of an image scanning (image frequency) and the rapid component M2 with the second period T2 of a line scanning. The first movement component M1 is a sawtooth function with the image frequency. In additional design possibilities, the first component M1 is a triangular function with half the image frequency. Due to the smaller first period T1, the first movement component M1 is to be equalized by simple methods.

A frequency of the image scanning (image frequency) is calculated based on=1/T1, a frequency of the line scanning is calculated based on=1/T2.

Subsequently, equalization refers to the correction of the nominal signal in order to generate a good agreement with the nominal movement component. Depending on frequency and directionality, the following methods can be considered:
- not to equalize the first movement component M1 at all;
- to subject the first movement component M1 to a compensation of the group delay, or
- to equalize the first movement component M1 by filtering in the local area;
- to equalize the first movement component M1 using the inverse transmission function of the scanner in the frequency response.

Figure 4:
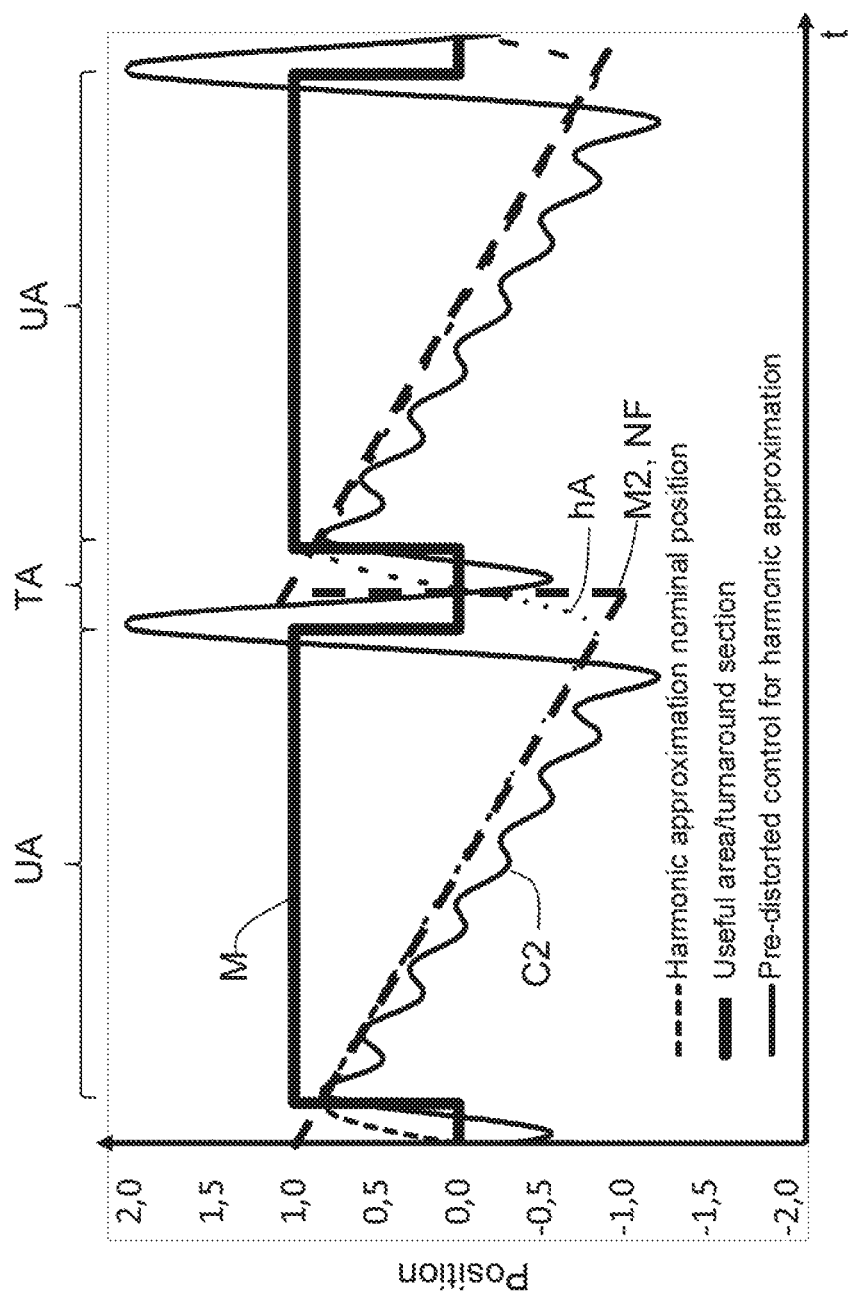
FIG. 4 illustrates schematically a third exemplary embodiment of the method with a pre-distorted control function.

With reference to FIG. 4, a configuration of a third exemplary embodiment of the invention is explained in more detail. FIG. 4 shows the useful areas UA, the turn-around areas TA, the high-frequency second movement component M2, its harmonic approximation hA and the pre-distorted control component C2.

For the second movement component M2, a harmonic approximation hA is calculated (FIG. 4). This consists in the minimum of the odd-numbered multiples of the image feed frequency (1, 3, 5 . . . ), the image feed frequency being the reciprocal of the period between two feed movements. The frequency thus depends on the frequency of the line scanning, the directionality of the line scanning, and, when appropriate, the number of multiple line scanning. Both movement components M1 (e.g. FIGS. 2, 3), M2 compensate each other in the useful area UA, so that no or only a minimal movement occurs in feed direction FD (FIG. 1) during this time.

For the sufficiently accurate calculation of the line feed LF (FIG. 1) in the direction of the Y-axis Y, only a limited number of multiples of the fundamental frequency (harmonic) is required.

This function referred to as harmonic approximation hA can be determined by direct Fourier decomposition, by optimization to an optimum agreement of the sawtooth function of the second movement component M2 in the useful area UA, or by another method.

With the harmonic approximation hA of the movement component M2, a band-limited representation of the high-frequency movement M2 is now available. Using the transmission function of the system, the control signal can be calculated from this movement. Various options are available:
- filtering in the frequency space with the reciprocal frequency response of the system,
- local area filtering by convolution with inverse system response, and
- compensation of the group delay.

This can take place in the following locations:
- (calculated) nominal input signal of the controlled scanner, and/or
- pre-control in the module of the controlled scanner.

The transmission function
- can be measured directly or
- can be determined indirectly by optimizing the image quality.

The corrected second component C2 of the second movement component M2 and the optionally also corrected first component C1 of the first movement component M1 (not shown) are adapted to each another so that the resulting movement M compensates in the useful area(s) UA (see for example also FIG. 2). For this purpose, the amplitude of the second component C2 is to be adapted to the line spacing of the scan, i.e. to the image height and number of lines.

With the resulting control signal, the scanning unit is controlled in the image feed direction (usually Y-axis), and at least one image is acquired.

One example for the performing of the method for pre-distortion of the second control component C2 for single-track recording of an image is now described with reference to FIG. 5:

1. The desired movement curve M is decomposed into a high-frequency portion M2 (second component M2) and a continuous low-frequency portion M1 (first component M1, see for example FIG. 2). The low-frequency portion M1 includes an active useful area of the image with a slow constant image feed and a passive return phase with a faster image return.

2. For the second movement component M2, the harmonic approximation hA is generated with a predetermined number of harmonics H (see below). In the case of simple bi-directional single-track scans, only the straight-line harmonics ($h_i$=2, 4, 6, . . . ) are created because the function is twice the fundamental frequency of the line scanning, since, in each case after one half-oscillation, a change-over to the next line is performed.

3. The harmonic approximation hA is optimized to the least possible deviation from the nominal function NF (second component M2) within the useful area UA. The harmonic approximation hA with H_LF (t) is described by:

$$H\_LF(t) = a_0 + \sum_{h_i}^{H} a_i \cdot \cos(2\pi h_i f_s t / T - b_i)$$

with $h_i = 2 \cdot k, k \in \mathbb{N}_0$,

The following values are given as an example for optimized parameters:

| $h_i$ | 0 | 2 | 4 | 6 | 8 | 10 | 12 | 14 | 16 |
|---|---|---|---|---|---|---|---|---|---|
| $b_i$ [rad] | 0 | 0 | 0 | 0 | 0 | 0 | 0 | 0 | 0 |
| $a_i$ [a.u] | 0 | 0.311 | 0.127 | 0.142 | 0.172 | 0.175 | 0.157 | 0.127 | 0.096 |

4. The frequency components of the harmonic approximation hA are corrected with the frequency response of the controlled scanner AS(f)=c(f)—c(f)·$e^{jvd(f)}$. Here, c describes the amplitude frequency response, and d the phase frequency response. For the pre-emphasized line feed HPE_LF (t), the harmonic approximation hA is corrected with the reciprocal frequency response.

$$HPE\_LF(t) = a_0 + \sum_{h_i}^{H} \frac{a_i}{c(f_s/T \cdot h_i)} \cdot \cos(h_i \cdot 2\pi \cdot f_s/T \cdot t - b_i + d(f_s/T \cdot h_i))$$

with $h_i = 2 \cdot k, k \in \mathbb{N}_0$,

5. The normalized first control component C1 is generated and, possibly, the scanner behavior is also corrected (here without correction):

$$BV(t) = (Z+L) \cdot \left( -\frac{1}{2} - \frac{4}{\pi} \sum_{z_i}^{\infty} (2 \cdot z_i + 1)^{-1} \cdot \cos\left( \frac{z_i \cdot 2\pi \cdot f_s / T \cdot t}{(Z+L)} \right) \right)$$

with $z_i \in \mathbb{N}$.

6. Subsequently, the pre-emphasized second control component C2 is summed with the optionally pre-emphasized control component C1 and scaled to the field to be scanned in infeed direction ID of the line feed LF ("feed direction") and scaled to the set image size with a factor $VV_A$ and an offset $VV_O$ in:

$$VVs(t) = VV_O + VV_A \cdot (BV(t) + HPE\_LF(t))$$

7. The scanning unit and the image capture are controlled with the thus calculated control signal.

Figure 5:
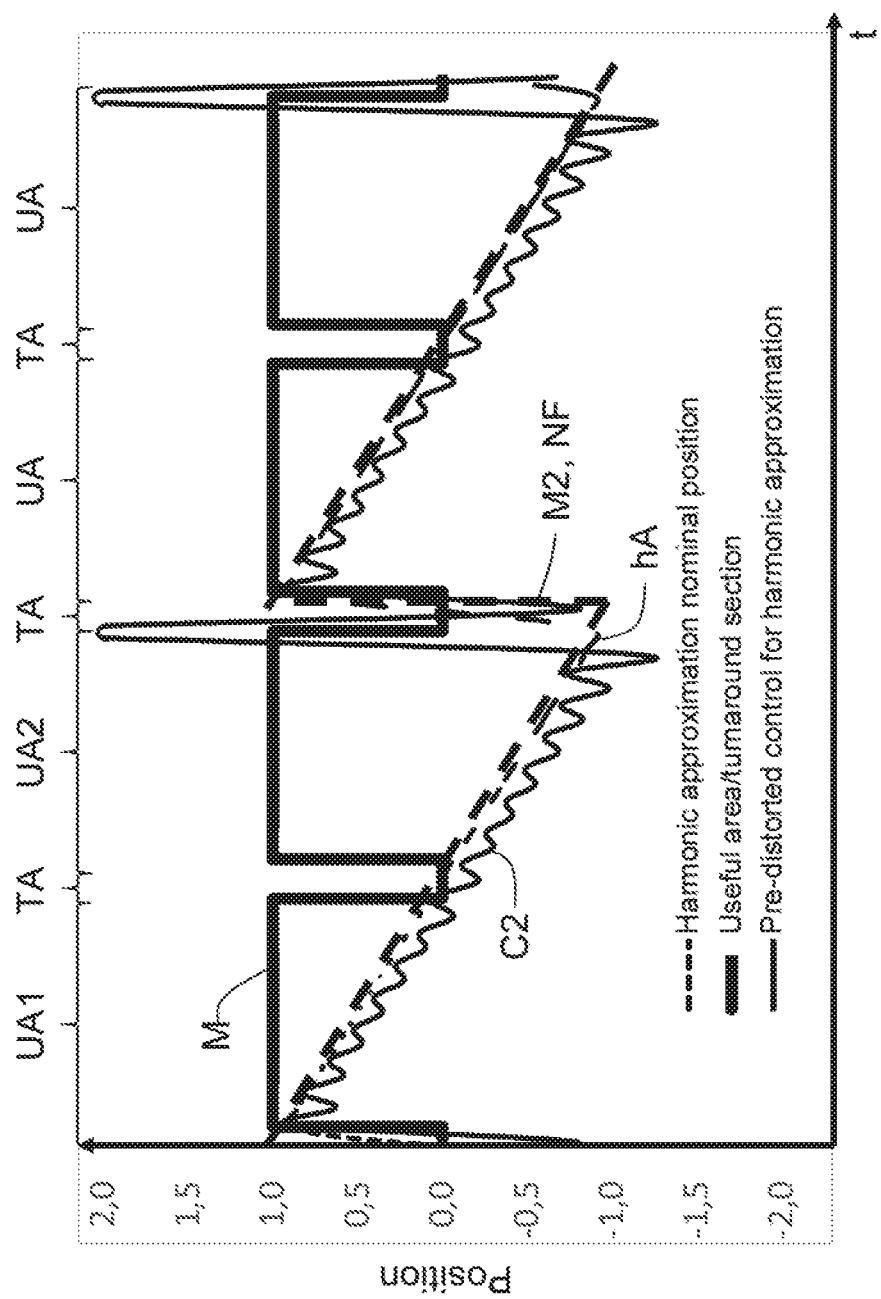
FIG. 5 illustrates schematically a fourth exemplary embodiment of the method with a pre-distorted control function with a double scan of a line (multi-track)

FIG. 5 shows the harmonic approximation hA of the second component M2, the pre-emphasized second control component C2, the nominal function NF as well as the distribution in time of the useful areas UA and the turn-around areas TA for a double multi-track. A first useful area UA1 illustrated by way of example, is scanned with a first illuminating radiation and a second useful area UA2, likewise illustrated by way of example, is scanned with a second illuminating radiation before a line feed LF occurs.

Another exemplary embodiment of the method for pre-distorting the second function F2 for a multi-track capture of an image with two captures is now described with reference to FIG. 5.

This correction differs from the exemplary embodiment discussed above with regard to FIG. 5 in the following:

The line number L (L=1, 2, 3 . . . ) can also be odd. The track number T is here T=2.

The number of harmonic components of the harmonic approximation hA is, for example, for a minimal deviation:

| $h_i$ | 0 | 2 | 4 | 6 | 8 | 10 | 12 | 14 | 16 |
|---|---|---|---|---|---|---|---|---|---|
| $b_i$ [rad] | 0 | 0 | 0 | 0 | 0 | 0 | 0 | 0 | 0 |
| $a_i$ [a.u] | 0 | 0.316 | 0.155 | 0.100 | 0.072 | 0.054 | 0.042 | 0.032 | 0.026 |
| $h_i$ | 18 | 20 | 22 | 24 | 26 | 28 | 30 | 32 | |
| $b_i$ [rad] | 0 | 0 | 0 | 0 | 0 | 0 | 0 | 0 | |
| $a_i$ [a.u] | 0.000 | 0.004 | 0.004 | 0.004 | 0.004 | 0.003 | 0.003 | 0.003 | |

All other steps correspond to the third exemplary embodiment. Thus, for a change in the track number T, the number of coefficients for the harmonic approximation hA and its coefficients must be adapted, and the frequency response must be known at a larger number of support points and at other frequencies.

Figure 6:
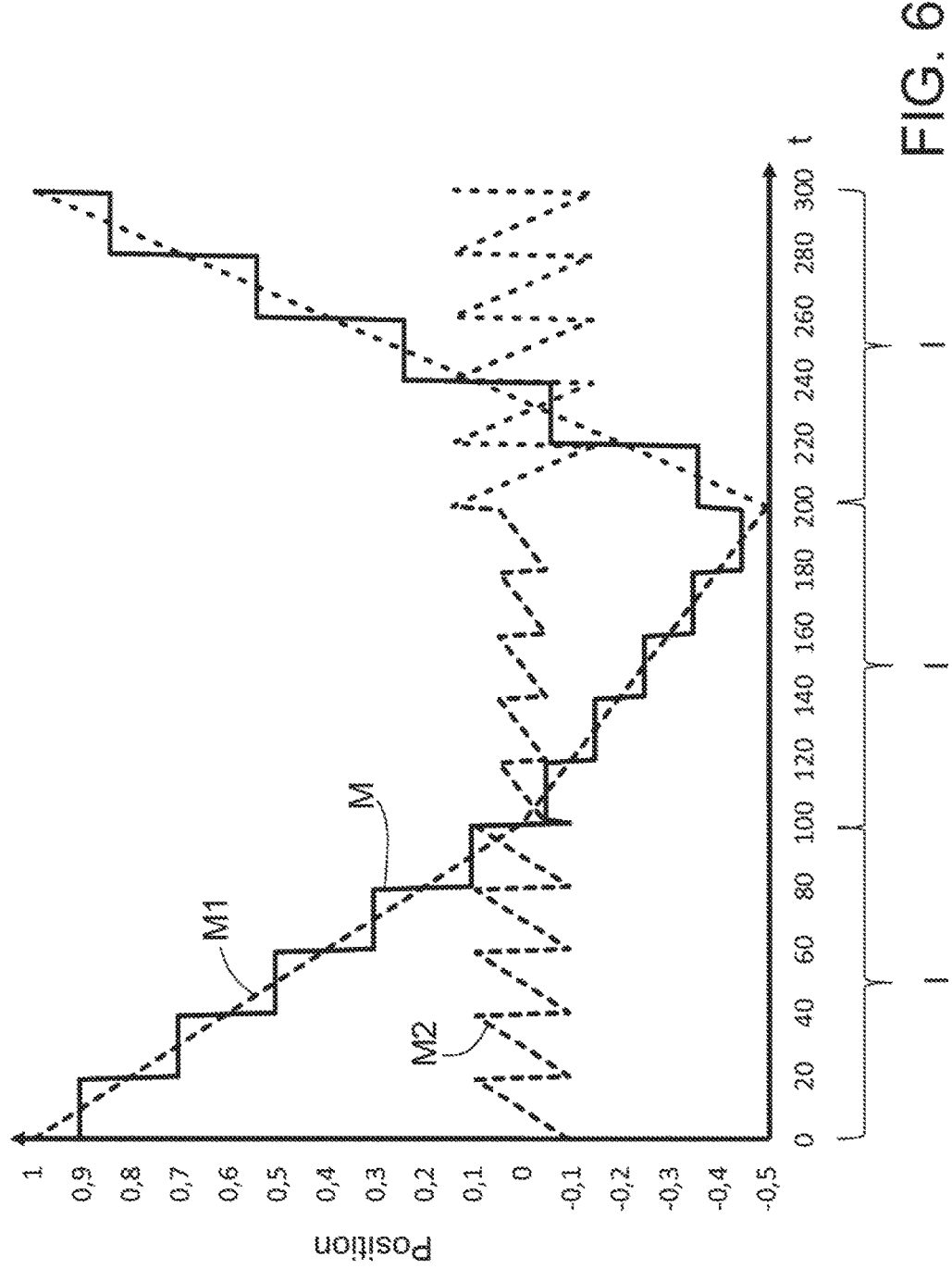
FIG. 6 illustrates schematically a fifth embodiment of the method with a pre-distorted control function with different line feed and direction.

FIG. 6 shows, in a fifth exemplary embodiment of the invention, a first component M1 which is linear in some sections, a second component M2, and a movement M obtained by summation.

The increase in the first component M1 changes at t=100 (halving, interval I: 100–<200) and t=200 (change in sign and tripling, interval I: 200-300). The amplitude of the second component M2 is adapted accordingly, so that the desired plateaus are formed. With varying increases in the first component M1, the amplitude and/or the profile of the second component M2 is to be correspondingly adapted.

Such an exemplary embodiment of the method is, for example, suitable for achieving a pre-distortion of the line feed LF with a varying resolution of line groups.

In a further exemplary embodiment of the invention, it is also possible for the line feed LF to be implemented with an alternating direction between two images in order to achieve a high frame rate even at high second frequencies f2 (line scan frequencies) and a small number L of scanned lines. See in this respect FIG. 8.

The sequence of the method is further subdivided into the following steps:

1. The feed movement is decomposed into a long-period (period T1) movement M1 for the image feed and a short-period (period T2) movement M2 for the line feed LF (see for example FIG. 2).
2. The first component M1 is constructed from a slow steady phase for the actual image capture and a faster phase for the image return. Optionally, the low-frequency part (first component M1) can also be pre-emphasized, e.g. by an IIR or FIR filter.
3. The high-frequency periodic portion M2 (second component M2) for the line feed LF is in turn decomposed into a certain number of harmonic frequency components which are optimized for a minimal deviation from the nominal function NF (harmonic approximation hA of the line feed LF).
4. The frequency components of the harmonic approximation hA of the high-frequency portion M2 of the line feed LF are corrected with the frequency response of the scanning unit.
5. A control signal C1, C2 of the different frequency components of the line feed LF is generated, and these components are summed up. When the scanning unit is controlled with the control signal thus obtained, it moves effectively with the desired movement M of the harmonic approximation hA.
6. The corrected first and second functions C1 and C2 (control components C1 and C2; line feed function and image feed function) are summed up and scaled to the image section while taking into account an amplitude and/or an offset.
7. The total control signal C=C1+C2 is to be calculated for each scanner/scanning unit, respectively. In the process, at least the signals Cx and Cy are created, and possibly signals from additional scanners (Cz, . . . ).
8. The scanning unit is controlled with the calculated control signals Cx and Cy and possibly additional scanners. In the process, the actual image capture occurs.

The steps 1 to 2 only need to be performed once. Step 3 must be performed once per system. For multi-track capture and single-track capture, different high-frequency components are necessary for the line feed LF. Only the steps 4 to 7 have to be recalculated prior to an image capture for the settings for the number of support points for the controlling per line, the second period T2, the number of lines, and the number of empty oscillations.

Figure 7:
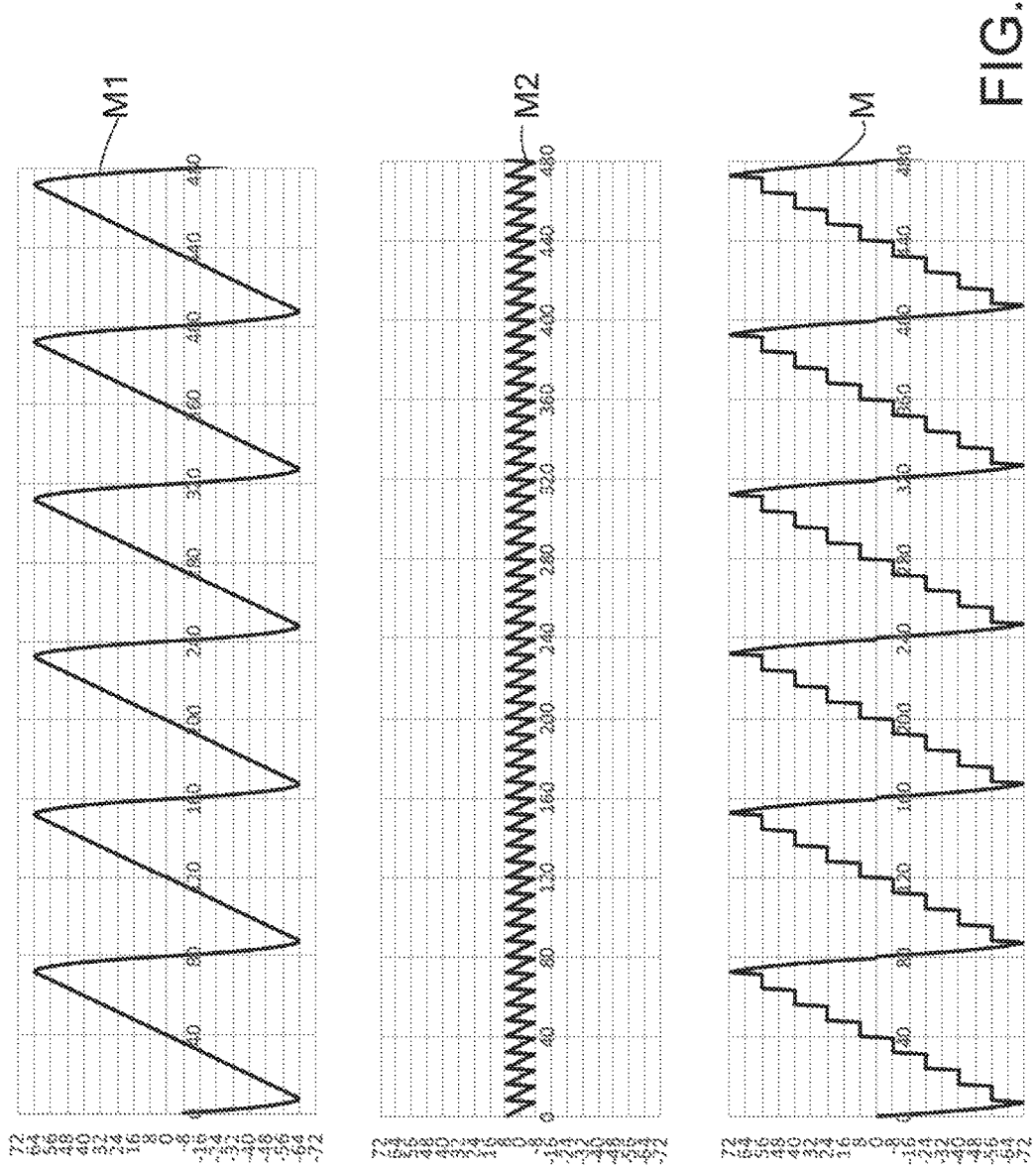
FIG. 7 illustrates schematically the unidirectional image scan (+ bidirectional in the rapid scanning direction) with the slow first movement component (top), the rapid second movement component (center) and the resulting movement (bottom) in the direction of the image feed.

FIG. 7 shows two movement components M1 and M2 of the line feed signal (usually Y-axis) for unidirectional image scanning, in which the individual image lines are always scanned in the same sequence. The unidirectional image scan (bidirectionally in the rapid scan direction) with the slow first movement component M1 (top), the fast second movement component M2 (center), and the resulting movement M (bottom) in the direction of image advance are shown.

Figure 8:
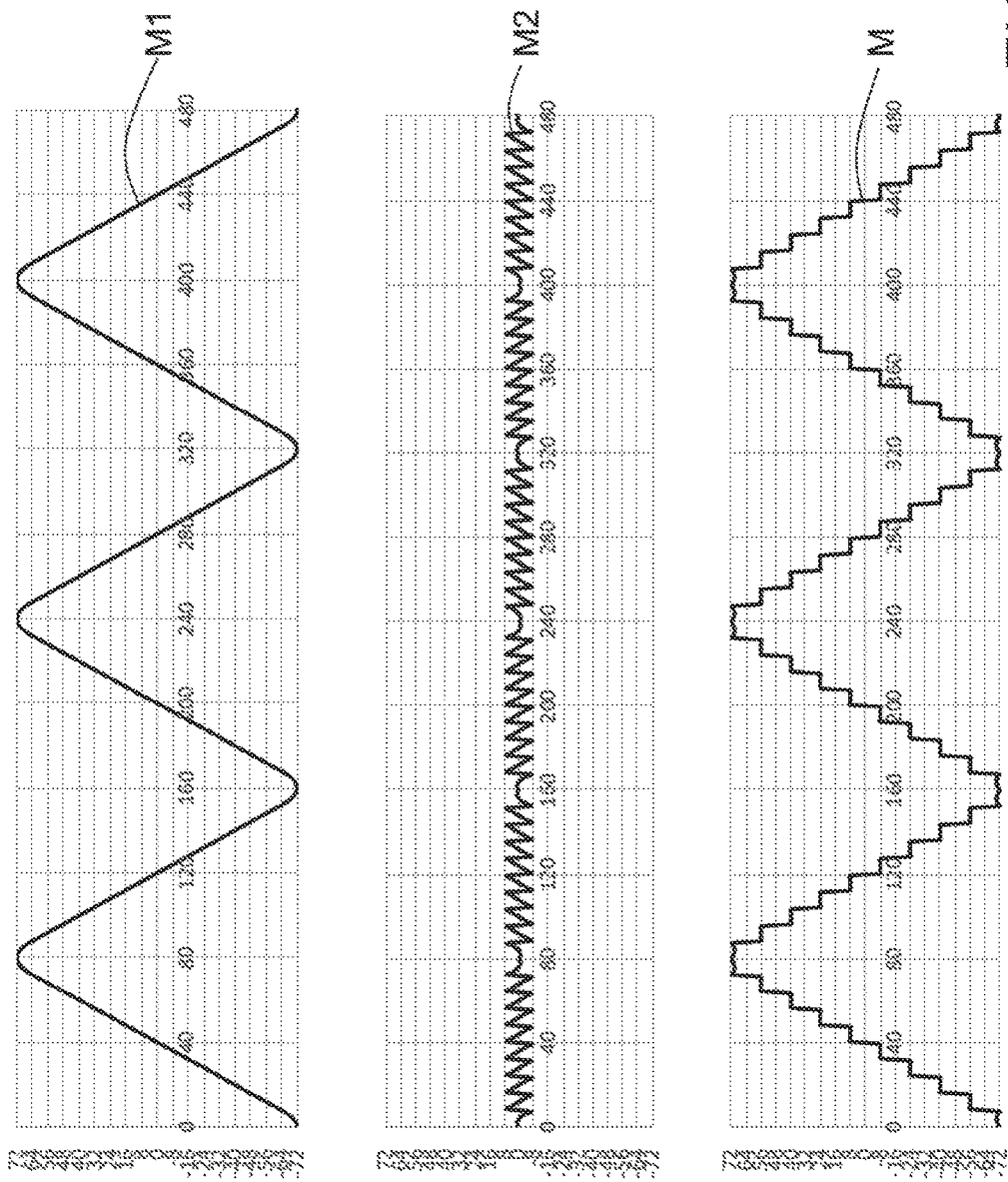
FIG. 8 illustrates schematically the bidirectional image scan (+ bidirectional in the rapid scanning direction) with the slow first movement component (top), the rapid second movement component (center) and the resulting movement (bottom) in the direction of the image feed.

FIG. 8 shows, in contrast to FIG. 7, the two movement components M1 and M2 of the line feed signal (usually Y-axis) for a bidirectional image scanning in which the individual image lines are scanned alternately from top to bottom and then from bottom to top to reduce the dead time at the end of an image. To this end, the high-frequency component M2 is to be inverted from one image to the other (see FIG. 8, center).

Figure 9:
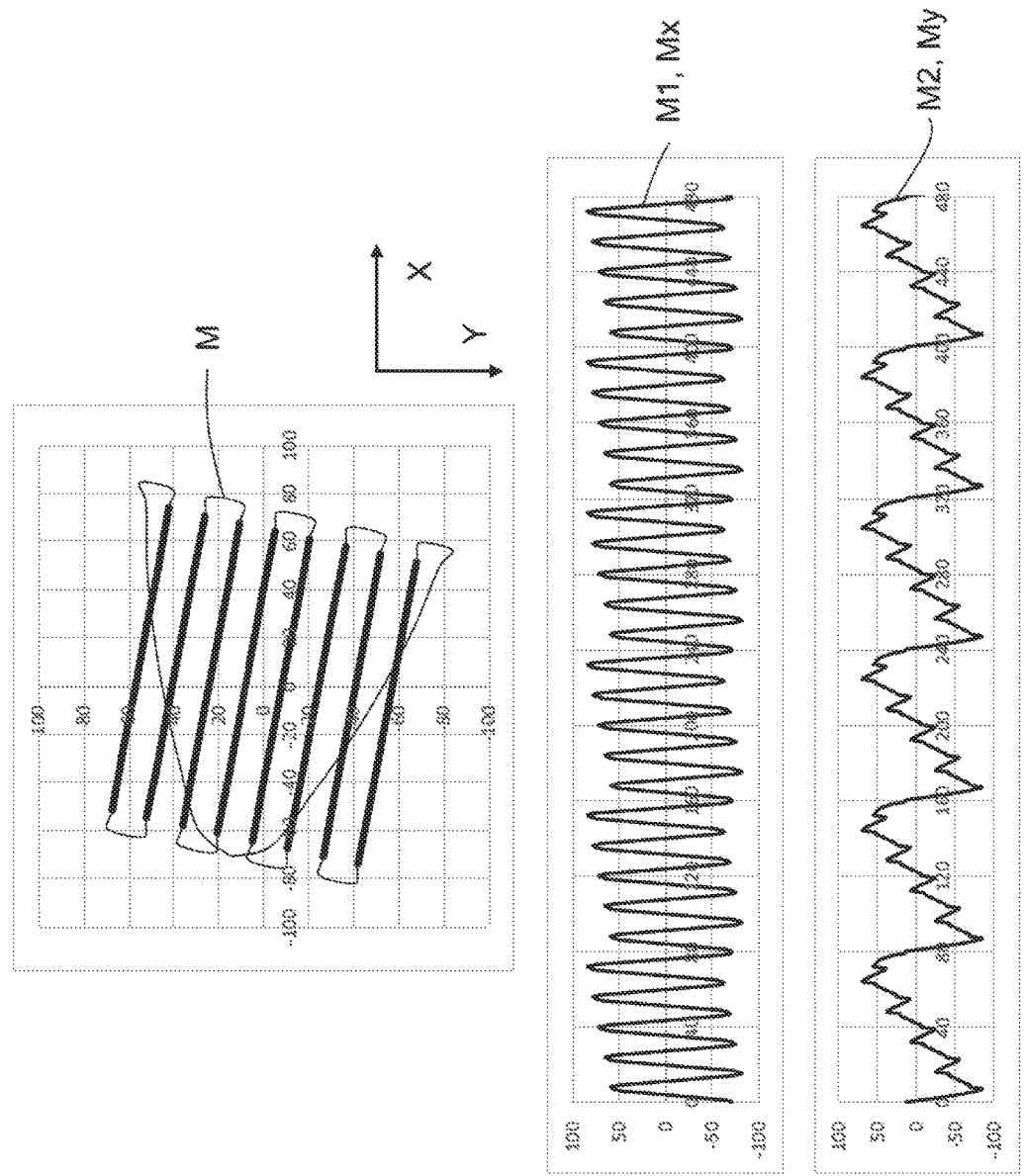
FIG. 9 illustrates schematically the complete movement of the scanners (top) for a rotated image scan relative to the scanner axes, the movement components for the horizontally scanning scanner (center) and the vertically scanning scanner (bottom)

FIG. 9 shows a rotated image scan as compared to the native scanner axes. The upper view shows the movement of the scanning in the XY plane, the two representations below show the temporal representation of the movements of the two scanners. Both scanners are each subjected to parts of line scanning and image scanning. The image scanning is in turn composed of the two components M1 and M2 so that the movement of the two scanners is composed of three components each. This is a schematic representation of the complete movement of the scanners (top) for a rotated image scan relative to the scan axes, the movement component (Mx) for the horizontally scanning scanner (center) and the movement component (My) of the vertically scanning scanner (bottom).

FIG. 10 shows an unrotated XYZ-3D scan in which, by the composition of a slow component M1 and a rapid component M2, both the image scanning (mostly Y scanners) and the batch scanning (usually Z scanners) allows the scanning of non-tilted rows and panes. The principle can be extended to any number of scanners (not shown), and also multi-dimensional scans can be rotated as desired as shown in FIG. 9. It illustrates schematically the complete movement of the scanners for a 3D scan aligned with the scanner axes, with the XY view of the movement (top), the X component Mx (top center), the Y component My (bottom center), and the Z component Mz of movement (third component M3) (bottom). Here, a complete slice (time 0-80) is used for the method of the Z scanner at the first Z position (Z position 40).

It is understood that the foregoing description is that of the exemplary embodiments of the invention and that various changes and modifications may be made thereto without departing from the spirit and scope of the invention as defined in the appended claims.

LIST OF REFERENCE NUMERALS

C1 component 1 of control signal C
C2 component 2 of control signal C
Cx control signal of the first scanner (usually x)
Cy control signal of the second scanner (usually y)
Cz control signal of the third scanner (usually z)
SC scan curve
M movement (of the scanner)
M1 first component (of the scanner movement); first function
M2 second component (of the scanner movement); second function
Mn n-th component (of the scanner movement)
Mx movement of the first scanner (usually x)
My movement of the second scanner (usually y)
Mz movement of the third scanner (usually z)
T1 first period (period length of image scanning)
T2 second period (period length of line scanning)
UA useful area
UA1 first useful area
UA2 second useful area
hA harmonic approximation
I interval
NF nominal function
t time
TA turnaround area
FD infeed direction
ID infeed distance
LF line feed
X X-axis
Y Y-axis
Z Z-axis

What is claimed is:

1. A method for generating a control function by using a computer, the method comprising:
   determining a first function and a second function, the first function being at least in sections a linear function with a first frequency, the second function being a periodic function with a second frequency, the first frequency being lower than the second frequency, the first and second functions increasing over sections of temporal progression in directions opposite to one another, and increases of the first and second functions being of a same magnitude; and
   generating the control function by summing up the first function and the second function.

2. A method for generating a control signal, the method comprising:
   decomposing a nominal movement into a first movement component and at least one second movement component, the nominal movement being a sum of the first movement component and the at least one second movement component, the first movement component being at least in sections a linear movement component with a first period, the second movement component being a periodic movement component with a second period, and a duration of the second period being shorter than a duration of the first period;
   separately generating a first control signal component of the first movement component and at least one second control signal component of the at least one second movement component;
   separately equalizing the first control signal component of the first movement component and the at least one second control signal component of the at least one second movement component; and
   generating the control signal by summing up the first control signal component and the at least one second control signal component.

3. A method for operating a scanning unit that is periodically displaceable in an infeed direction by an infeed distance, the method comprising:
   generating the control function according to claim 1; and
   generating a control signal by utilizing the control function.

4. A method for operating a scanning unit periodically displaceable in an infeed direction by an infeed distance, the method comprising:
   generating the control signal according to claim 2 as a function of the nominal movement; and
   controlling the scanning unit by the control signal.

5. The method according to claim 1, wherein:
   the first movement component is a slow, continuous, and long-period movement component, and
   the first period of the first movement component has a duration that corresponds to a single image duration during unidirectional image scanning.

6. The method according to claim 1, wherein:
   the first movement component is a slow, continuous, and long-period movement component, and the first period of the first movement component has a duration that is twice the image duration during bidirectional image scanning.

7. The method according to claim 1, wherein:
the second movement component is a fast, short-period movement component, and
a duration of the second period corresponds to a temporal distance between two image lines.

8. The method according to claim 1, wherein the second movement component includes a number of harmonic frequency components which are determined to permit deviations from a nominal function to be minimized.

9. The method according to claim 2, wherein the first movement component and the at least one second movement component are equalized independent of each other and result in the first and the at least one second control signal components which correct a transmission behavior of a scanning unit and based on which the control signal is generated.

10. The method according to claim 2, further comprising:
controlling an infeed of a scanning unit having a plurality of scanning directions and being configured as a scanner, the infeed being controlled by respective control signals in one of the scanning directions of the scanning unit.

11. The method according to claim 10, further comprising:
controlling a plurality of scanning units by respective control signals in order to achieve a multi-dimensional scanning of an object, a space, or the object and the space.

12. The method according to claim 1, further comprising:
acquiring location-resolved image values by a scanning unit; and
providing the location-resolved image values for image generation.

13. The method according to claim 2, further comprising:
decomposing the nominal movement, generating the first and the at least one second control signal components, and equalizing the first and the at least one second control signal components for more than two dimensions.

14. The method according to claim 13, further comprising:
performing a synthesis with respective moving components for scanning axes,
wherein coordinate axes of a multi-dimensional movement and the scanning axes do not coincide.

* * * * *